Patented Aug. 8, 1939

2,168,348

UNITED STATES PATENT OFFICE 2,168,348

CELLULOSIC COMPOSITION AND METHOD OF PREPARING SAME

Emmette F. Izard, Kenmore, N. Y., assignor to E. I. du Pont de Nemours & Company, Wilmington, Del., a corporation of Delaware No Drawing. Application June 4, 1937, Serial No. 146,440

16 Claims. (Cl. 134—79)

This invention relates to the production of cellulose derivative compositions. More particularly, it relates to improvements in the production of cellulose organic derivative compositions which may be formed into cellulosic structures such as threads, yarns, filaments, films, pellicles, caps, bands or the like having an affinity for all dyestuffs.

In the copending patent applications of W. W. Heckert, Serial Nos. 143,829 and 143,830, filed May 20, 1937, methods are disclosed for the production of cellulose organic derivative compositions comprising certain modifying polymeric amino nitrogen containing compounds which are preferably substantially insoluble in water and in 5% aqueous ammonia solution and soluble in 2% aqueous acetic acid solution, which compositions may be used for the production of cellulose derivative structures having an affinity for all dyestuffs. Cellulose derivatives, particularly cellulose esters such as cellulose acetate can, due to this remarkable discovery, be dyed with cheaper dyes and with less expensive procedures. The so-modified cellulose acetate furthermore may be union dyed in mixed fabrics with a single dye in a single dyeing operation; it may be dyed with direct, developed, and other dischargeable dyes and the dyed fabrics may be discharge printed without resort to expensive and degrading saponification procedures.

For convenience, the invention will be described with specific reference to cellulose acetate, it is, however, to be understood that the invention is applicable to other organic acid derivatives of cellulose.

It has now been discovered that some of the resinous polymeric compounds containing amino nitrogen of the above-identified Heckert applications, for example, certain resinous polymerized amino alcohol esters of acrylic and alpha substituted acrylic acids, suffer the disadvantage of being somewhat incompatible with cellulose acetate solutions and of forming therewith a relatively turbid and rubbery liquid which can be converted into valuable articles, such as threads and films only with difficulty.

It is therefore an object of this invention to produce improved cellulose derivative compositions.

It is another object of this invention to produce cellulose derivative compositions which can be readily converted into products having an affinity for all dyestuffs.

It is a further object of this invention to produce cellulose derivative compositions comprising polymeric amino nitrogen containing compounds which are clear and homogeneous and which may be readily converted into products having an affinity for all dyestuffs.

It is a still further object of this invention to produce clear and homogeneous cellulose derivative compositions containing polymeric amino nitrogen containing compounds, which compositions normally have a tendency to be turbid, whereby to produce an improved composition for the production of filaments, films and the like.

Other objects of the invention will appear hereinafter.

The objects of the invention may be accomplished, in general, by adding to turbid solutions of organic acid derivatives of cellulose, comprising resinous, polymeric amino nitrogen containing compounds such as disclosed in the above-mentioned applications of W. W. Heckert, a small quantity of an organic acid having an ionization constant in water of at least $1 \times 10^{-5}$.

This invention has particularly valuable application in securing a clear and homogeneous acetone solution of cellulose acetate with a resinous amino alcohol derivative of a polymeric compound and specifically with beta-diethylaminoethyl methacrylate, but it is also advantageously applied in clarifying solutions of cellulose acetate with other resinous polymeric compounds containing amino nitrogen, for instance, 1-(beta-methacrylyl oxyethyl) piperidine, 4-(beta-methacryloxyethyl) morpholine, and resinous condensation polymers of N-N-dibutyl glycine with polyvinyl alcohol, or of an amino dihydric alcohol such as beta-diethanol methyl amine with a dibasic acid such as phthalic acid.

In accordance with the present invention a small quantity of an organic acid having an ionization constant in water of at least $1 \times 10^{-5}$ is added to clarify a turbid cellulose acetate solution containing a resinous polymeric amino nitrogen containing compound and the clarified solution is converted by standard procedures into valuable shaped articles such as films, threads, caps, bands, etc. Preferably, a quantity of acid corresponding to between one-third of and the full amount required theoretically for complete conversion to a salt of the resinous amino alcohol derivative of the polymeric compound is added.

Cellulose derivative articles, especially cellulose ester articles produced in this manner exhibit a particularly improved affinity for the so-called "direct" dyes, "acid" dyes, "developed" color dyes, "chrome" dyes and "vat" dyes.

As illustrative of dyes for which the modifiers of the present invention impart a satisfactory affinity in the cellulose derivatives may be mentioned:

Direct dyes such as those having color index Nos. 382, 518, 278, 533, 415, 365, 598, 419, 326, 512, 593 and 539.

Acid dyes, such as those having color index Nos. 430, 667, 649, 31, 1088 and 307.

"Developed" color dyes, such as those having color index Nos. 324-A, 401, 317, 654 and 552.

Chrome dyes, such as those having color index Nos. 179, 216, 40, 299 and 302.

Vat dyes, such as those having color index Nos. 1101, 1113 and 1095, as well as "Sulfanthrene" Scarlet G Paste.

Basic dyes, such as those having color index Nos. 922 and 749.

Basic substituted anthraquinone dyestuffs, commonly used to dye unmodified cellulose acetate rayon, such as Celanthrene Red Y, Celanthrene Fast Light Yellow, Celanthrene Sky Blue B, and Celanthrene Scarlet G. These dyestuffs are disclosed in the 1934 Yearbook of the American Association of Textile Chemists and Colorists but color index numbers have not been assigned thereto.

The color index numbers cited in the present specification are all taken from Rowe's "Colour Index", Society of Dyers and Colorists, First Edition, 1924.

The following examples are given to illustrate the useful application of the invention, it being understood, of course, that the invention is not limited to these precise examples which are merely illustrative of the invention.

Example I

Six and one-half parts of beta-diethylaminoethyl methacrylate, and 1.1 parts of lactic acid are dissolved in acetone and to this solution sufficient cellulose acetate is added to form a spinning solution containing 20% cellulose acetate, 2% polymer, and 78% acetone. The solution is clear and of a viscosity which may be readily dry spun into yarn by customary procedures in which the polymer is homogeneously dispersed. The yarn so-formed will have a very satisfactory affinity for direct dyes when dyed in the following manner:

Before dyeing, the modified yarn is soaked in an aqueous bath containing 0.5% sodium oleate soap and 0.5% sodium carbonate heated to from 70-80° C. for 15 minutes. The yarn is rinsed with water and permitted to drain for a few minutes, after which it is immersed in a dye bath. The aqueous dye bath is made up with 15-20% of Glauber's salt, 4% of acetic acid of 28% concentration, and with a sufficient quantity of a direct cotton dye, color index No. 382, to give the requisite depth of shade and a 40:1 ratio of liquor volume to the weight of the material. The yarn is entered into the lukewarm bath and turned frequently while the temperature of the dye bath is raised to 85-90° C. and maintained there for 15 minutes. Two further 4% additions of acetic acid (28%) are made, each followed by heating to 80-90° C. for 15 minutes, if necessary, to obtain exhaustion of the dye bath.

Example II

Polymerized beta-diethylaminoethyl methacrylate together with acetic acid is dissolved in a mixture of 85% methyl acetate, 10% methyl alcohol and 5% water and sufficient cellulose acetate is dissolved therein to form a solution containing:

| | Parts by weight |
|---|---|
| Cellulose acetate | 30 |
| Polymerized beta-diethylaminoethyl methacrylate | 3 |
| Methyl acetate | 170 |
| Methyl alcohol | 20 |
| Water | 10 |
| Acetic acid | 0.85 |

The solution is clear, has a homogeneous texture, and a satisfactory viscosity for the production of fibers, threads, films and other products.

The solution is spun electrically in the manner described in Formhals U. S. Patent No. 1,975,504 to yield fibers which, when dyed in the manner described under Example I, show good affinity for direct and other dyes.

Example III

A taffeta fabric woven from cellulose acetate threads spun from the cellulose acetate solution described in Example I may be dyed with a "developed" color dye in the following manner:

An aqueous dye bath is made up with 15-20% of Glauber's salt, 4% of acetic acid of 28% concentration, and with sufficient quantity of developable dye, color index No. 317, to give the desired depth of shade. The modified cellulose acetate taffeta is entered into the lukewarm bath which has a 40:1 ratio of liquor volume to the weight of the material, the temperature is raised to 80-90° C., and maintained there for 15 minutes while frequently turning the taffeta. Then, two further 4% additions of acetic acid (28% concentration) are made, each followed by heating at 80-90° C. for 15 minutes if necessary, to obtain exhaustion of the dye bath. The fabric is next removed from the dye bath, rinsed well, and entered into a diazotizing bath at a temperature of 18-24° C. and containing 3% sodium nitrite and 4% sulfuric acid. After a treatment of 20 minutes with occasional turning, the fabric is quickly but thoroughly rinsed with water and entered into a developing bath cooled to a temperature of 15-18° C. and containing 1% of beta-naphthol as the developer and 0.5% sodium hydroxide. The fabric is treated with the diazotizing bath for a period of 20 minutes, then is rinsed thoroughly, squeezed out, and dried. The fabric is found to have good affinity for the developed color dyestuffs.

Example IV

A fabric woven from cellulose acetate threads modified with polymerized beta-diethylaminoethyl methacrylate in accordance with the procedure outline in Example I may be dyed with a chrome dye in the following manner:

An aqueous dye bath is made up with 15-20% of Glauber's salt, 4% of acetic acid (28% concentration) and with a sufficient quantity of chrome dye of color index No. 179 to give the desired shade and a 40:1 ratio of liquor volume to the weight of the material. The thoroughly wetted fabric is entered in this dye bath and turned for 10 minutes. During the course of the next 15 minutes, the temperature of the dye bath is gradually raised to 85-90° C. and dyeing continued at that temperature for 30 minutes with frequent turning of the fabric. At the end of 30 minutes, the fabric is lifted from the dye bath, 10% additional acetic acid is added to the dye liquid and the dyeing continued for 30 minutes. The fabric is then lifted from the dye bath and entered in a fresh aqueous bath containing 2% potassium dichromate and 4% formic acid. The fabric is entered into this bath at 70° C. which is then heated to 85–90° C. for 90 minutes. The dyed fabric is withdrawn, rinsed thoroughly, squeezed out and dried. The fabric is found to have a good affinity for chrome dyes.

Example V

To print a red shade on a woven or knitted fabric containing the cellulose derivative yarn modified with a water soluble organic acid salt of an amino alcohol derivative of a polymeric compound, the following procedure may be used:

Thickening:

| | Grams |
|---|---|
| Highly torrefied corn starch (British gum) | 600 |
| Gum arabic (50% aqueous solution) | 600 |
| Water | 800 |
| Total | 2,000 |

The British gum, dissolved in a little water, is mixed with gum arabic solution and more water added, after which the whole is boiled for 10 minutes and made up to bulk.

Printing color:

| | Grams |
|---|---|
| Acid dye, Color Index No. 430 | 4 |
| Sodium carbonate | 5 |
| Ammonium thiocyanate | 20 |
| Water | 45 |
| Thickening (prepared as above) | 205 |
| Total | 279 |

After the sodium carbonate and dye have been dissolved separately in a little water, the solutions are poured together and intimately mixed with the thickening. The ammonium thiocyanate dissolved in water, is now added and the whole is brought to the boil and bulked.

The so-prepared paste may be applied by the roller printing method, although any recognized printing procedure may be employed. In the roller printing method, the printing roller consists of an iron mandrel having an outer copper shell bearing an intaglio engravure of the design to be printed. Below the printing roller is located a color box containing the printing paste. Between the color box and the printing roller is placed a revolving brush which picks up the printing paste and smears it in a promiscuous fashion over the surface of the printing roller. As the printing roller rotates, a doctor knife scrapes the printing paste cleanly from the plain surface portion, leaving only the engraved portions of the printing roller filled with printing paste. A pressure drum having a springy surface is positioned above and in contact with the printing roller. The cellulose acetate fabric is passed between the printing roller and the pressure drum and becomes printed by being forced into the engraved portions of the printing roller carrying the printing paste. The printed fabric is dried preferably with hot air, dry steamed for 15–20 minutes, soaped lightly at 60° C., washed in soft water, and dried. The printed portions of the fabric apparently are relatively fast to washing. In similar fashion, the fabrics may be printed with direct, basic, and other dyestuffs.

Example VI

Cellulose acetate fabric woven from cellulose acetate threads modified with beta-diethylaminoethyl methacrylate in accordance with the procedure outlined in Example I may be dyed with a vat dyestuff, color index No. 1101, in the following manner:

Twenty parts of the dye paste are mixed with 80 parts of the following composition:

550 parts of a boiled mixture comprising:

| | Parts |
|---|---|
| Gum tragacanth (6%) | 700 |
| British gum powder | 300 |
| Potassium carbonate | 190 |

Dissolve at 170° F., cool to 140° F. and add:

| | Parts |
|---|---|
| Sodium sulfoxylate formaldehye | 160 |
| Glycerin | 50 |
| Water | 50 |

The dye mixture is printed on the fabric, dried, aged for 4–6 minutes at 214–220° F. in an air free ager, after which it is oxidized for 2–3 minutes at 110–130° F. in the following bath:

| | Parts |
|---|---|
| Sodium perborate | 5 |
| Water | 1000 |

After oxidation the prints are rinsed, soaped lightly, rinsed and dried.

If desired, this printing of the vat dye can be carried out on a modified cellulose acetate fabric, dyed with a readily dischargeable ground shade by the use of a developed dye as above described in Example III.

The modified cellulose acetate fabric will be dyed readily to any desired depth in this manner and any developed color will be readily discharged.

If it is desired to get a white discharge of the developed, or direct color, the following procedure can be used:

A printing paste is prepared as follows:

| | Parts |
|---|---|
| Zinc sulfoxylate formaldehyde Conc | 20 |
| Diethylene glycol | 15 |
| Water | 15 |
| Gum tragacanth (6% solution) | 50 |

Example VII

To an ethyl cellulose composition composed of 20% ethyl cellulose and 80% toluene and alcohol mixture, the mixture being constituted as 80% toluene and 20% alcohol, said composition containing 10% of a modifying agent comprising N-N-dibutylpolyvinyl glycine, add a quantity of acetic acid slightly in excess of the amount theoretically necessary to react with the glycine present. The ethyl cellulose composition which is slightly turbid prior to the addition of the acetic acid will be found to be substantially completely clarified after the addition of the acid. The ethyl cellulose composition can then be readily dry spun into a yarn according to customary procedures in which the glycine will be homogeneously incorporated throughout. The yarn so-formed will have an excellent affinity for all dyestuffs.

The pastes are printed on the dischargeable ground or direct or developed dye, dried, aged for 4–6 minutes at 214–220° F. in an air free ager, rinsed, soaped lightly if desired, rinsed and dried.

In discharge printing it is distinctly preferred to apply the zinc or sodium formaldehyde sulfoxylate in the presence of a cellulose acetate swelling or softening agent which may be inorganic such as a thiocyanate or organic such as a polyhydric alcohol or derivative thereof. In this connection zinc thiocyanate alone or in admixture with an organic swelling agent is an especially good discharge assistant particularly with sodium formaldehyde sulfoxylate.

In all the above examples, unless otherwise specified, the percentages are based on the weight of the material being treated.

It will be recognized, of course, that the resinous amino alcohol derivatives of polymeric compounds may be added to the cellulose acetate solutions in concentrations as high as 30% or even more, based on the weight of the cellulose acetate. In general, however, I find that concentrations ranging from 3% up to about 15%, depending of course on the effectiveness of the specific materials chosen, are sufficient for most purposes. While it is possible to increase the depth of dyeing by the addition of still larger quantities of the modifier, the increased depth of dyeing is offset by weakening of the cellulose acetate structure so that from a practical standpoint, it is advisable to use no more resin in the cellulose acetate structure than is necessary to obtain the desired depth of color.

It is preferred to select a solvent of the polar type for the cellulose acetate and the resinous amino alcohol derivative of the polymeric compound, for instance, acetone or methyl acetate individually or in admixture with methyl or ethyl alcohol. Preferably also, at least 1% of water is present in the solvent.

The invention is of primary interest in connection with organic acid esters of cellulose and more particularly cellulose acetate although other cellulose esters such as cellulose propionate, cellulose butyrate, cellulose acetopropionate, and the like can be produced having improved dyeing characteristics by incorporating therein one or more of the resinous amino alcohol derivatives of the polymeric compounds by the procedure of this invention. Furthermore, cellulose ethers, such as benzyl cellulose, ethyl cellulose, methyl cellulose, glycol cellulose, etc., whether in the form of threads, films or other form, may be endowed with improved dyeing properties when modified in accordance with the teachings of the invention.

It will be recognized of course that the acetic and lactic acids of the examples are only illustrative and that they may be replaced with any other organic acid having an ionization constant in water of at least $1 \times 10^{-5}$. As examples of other acids which will be operative to carry out the principles of the present invention may be mentioned:

Fatty acids—formic acid, propionic acid.
Polybasic acids—oxalic acid, malonic acid, succinic acid.
Keto acids—levulinic acid.
Aromatic acids—benzoic acid.
Polybasic hydroxy acids—tartaric acid, citric acid.

Generally, the cellulose acetate solution containing the modifying agent may be secured in a substantially clear and homogeneous condition by the addition of a relatively small amount of the above-mentioned type of organic acid. The specific amount of acid required will depend of course upon the particular organic acid chosen. Generally, no more acid is added than is necessary to achieve the desired clarity and fluidity since further addition of acid sometimes causes the turbidity to return. For the most part, it is preferred to add the acid in a quantity corresponding approximately between one-third of and the full amount required theoretically for complete conversion to the salt of the amino alcohol derivative of the resinous polymeric compound. The order of addition of the constituents is relatively unimportant; mostly, however, it is preferred to add the organic acid to the solution of resinous amino alcohol derivative of the polymeric compound before admixture with the cellulose acetate.

From the above-mentioned applications of W. W. Heckert, it is apparent that the use of the polymeric modifying agents is very advantageous. Their use very greatly widens the range of dyestuffs available for use with cellulose acetate and other cellulose derivatives. When high concentrations of the polymers are used in compositions for the production of films, threads or the like, there is danger of weakening the cellulose derivative structure. Consequently, when the cellulosic solutions containing the polymers are turbid or cloudy, it will require a higher concentration of polymers than when the solutions are clear, in order to obtain the same depth of dyeing. By the addition of the organic acids of the present invention to the cellulosic solutions, it is possible to obtain the desired coloring effect without endangering the weakening of this material.

By rendering the cellulose acetate solutions compatible with these resinous amino alcohol derivatives of polymeric compounds, the present invention furnishes substantially clear and homogeneous solutions which are readily converted into the above-described desirably modified threads and films. The invention also seems to reduce the quantity of modifier required for the same degree of dye affinity as compared with turbid solutions.

Since it is obvious that many changes and modifications may be made in the above-described methods without departing from the nature and spirit of the invention, it is to be understood that the invention is not to be limited to the specific details described above, except as set forth in the appended claims.

I claim:

1. A clear, homogeneous composition which may be readily formed into filaments and films composed of an organic acid derivative of cellulose, a resinous polymeric amino nitrogen containing compound which when mixed with said organic derivative of cellulose will form a turbid composition, and, as a material to prevent turbidity of the composition, an organic acid having an ionization constant in water of at least $1 \times 10^{-5}$.

2. A clear, homogeneous composition which may be readily formed into filaments and films composed of a cellulose ester, a resinous polymeric amino nitrogen containing compound which when mixed with said organic derivative of cellulose will form a turbid composition, and, as a material to prevent turbidity of the composition, an organic acid having an ionization constant in water of at least $1 \times 10^{-5}$.

3. A clear, homogeneous composition which may be readily formed into filaments and films composed of a cellulose ester, a resinous polymeric amino nitrogen containing compound which when mixed with said organic derivative of cellulose will form a turbid composition, and, as a material to prevent turbidity of the composition, an organic acid having an ionization constant in water of at least $1 \times 10^{-5}$, said organic acid being present in an amount less than the theoretical amount necessary to react with the polymeric compound in the composition.

4. A clear, homogeneous composition which may be readily formed into filaments and films composed of a cellulose ester, a resinous amino alcohol derivative of a polymeric compound which when mixed with said organic derivative of cellulose will form a turbid composition, and, as a material to prevent turbidity, an organic acid having an ionization constant in water of at least $1 \times 10^{-5}$.

5. A clear, homogeneous composition which may be readily formed into filaments and films composed of a cellulose ester, a resinous amino alcohol derivative of a polymeric compound which when mixed with said organic derivative of cellulose will form a turbid composition, and, as a material to prevent turbidity of the composition, an organic acid having an ionization constant in water of at least $1 \times 10^{-5}$ and taken from the group consisting of beta-diethylaminoethyl methacrylate, 1-(beta-methacrylyl oxyethyl) piperidine, 4-(beta-methacryl-oxyethyl) morpholine, N-N-dibutylpolyvinyl glycine, and the resinous condensation polymer of beta-diethanol methyl amine with phthalic acid.

6. A clear, homogeneous composition which may be readily formed into filaments and films composed of a cellulose ester, acetone, a resinous amino alcohol derivative of a polymeric compound which when mixed with said organic derivative of cellulose will form a turbid composition, and, as a material to prevent turbidity of the composition, an organic acid having an ionization constant in water of at least $1 \times 10^{-5}$.

7. A clear, homogeneous composition which may be readily formed into filaments and films composed of cellulose acetate, acetone, polymeric beta-diethylaminoethyl methacrylate and, as a material to prevent turbidity of the composition, an organic acid having an ionization constant in water of at least $1 \times 10^{-5}$.

8. A clear, homogeneous composition which may be readily formed into filaments and films composed of cellulose acetate, acetone, polymeric beta-diethylaminoethyl methacrylate, and, as a material to prevent turbidity of the composition, lactic acid.

9. The method of improving compositions composed of organic acid derivatives of cellulose and resinous polymeric amino nitrogen containing compounds which are inclined to be turbid, which comprises incorporating in said composition an organic acid having an ionization constant in water of at least $1 \times 10^{-5}$.

10. The method of improving compositions composed of cellulose esters, and resinous polymeric amino nitrogen containing compounds which are inclined to be turbid which comprises incorporating in said composition an organic acid having an ionization constant in water of at least $1 \times 10^{-5}$.

11. The method of improving compositions composed of organic acid derivatives of cellulose and resinous polymeric amino nitrogen containing compounds which are inclined to be turbid which comprises incorporating in said composition an organic acid having an ionization constant in water of at least $1 \times 10^{-5}$, the amount of acid incorporated being less than the theoretical amount necessary to react with the polymeric compound present.

12. The method of improving compositions composed of organic acid derivatives of cellulose and resinous amino alcohol derivatives of polymeric compounds which compositions are inclined to be turbid, the step which comprises incorporating in said composition an organic acid having an ionization constant in water of at least $1 \times 10^{-5}$.

13. The method of improving compositions composed of organic acid derivatives of cellulose and resinous polymeric amino nitrogen containing compounds which compositions are inclined to be turbid, the step which comprises incorporating in said composition an organic acid having an ionization constant in water of at least $1 \times 10^{-5}$ taken from the group consisting of beta-diethylaminoethyl methacrylate, 1-(beta-methacrylyl oxyethyl) piperidine, 4-(beta-methacryl-oxyethyl) morpholine, N-N-dibutylpolyvinyl glycine, and the resinous condensation polymer of beta-diethanol methyl amine with phthalic acid.

14. The method of improving compositions composed of cellulose acetate, acetone, and a resinous amino alcohol derivative of a polymeric compound, which compositions are inclined to be turbid, the step which comprises incorporating in said composition an organic acid having an ionization constant in water of at least $1 \times 10^{-5}$ taken from the group consisting of beta-diethylaminoethyl methacrylate, 1-(beta-methacrylyl oxyethyl) piperidine, 4-(beta-methacryl-oxyethyl) morpholine, N-N-dibutylpolyvinyl glycine, and the resinous condensation polymer of beta-diethanol methyl amine with phthalic acid.

15. The method of improving compositions composed of cellulose acetate, acetone, polymeric beta-diethylaminoethyl methacrylate, which compositions are inclined to be turbid, the step which comprises incorporating in said composition an organic acid having an ionization constant in water of at least $1 \times 10^{-5}$ taken from the group consisting of beta-diethylaminoethyl methacrylate, 1-(beta-methacrylyl oxyethyl) piperidine, 4-(beta-methacryloxyethyl) morpholine, N-N-dibutylpolyvinyl glycine, and the resinous condensation polymer of beta-diethanol methyl amine with phthalic acid.

16. The method of improving compositions composed of cellulose acetate, acetone, polymeric beta-diethylaminoethyl methacrylate, which compositions are inclined to be turbid, the step which comprises incorporating in said composition lactic acid.

EMMETTE F. IZARD.